(12) United States Patent
Salonen

(10) Patent No.: US 6,701,285 B2
(45) Date of Patent: Mar. 2, 2004

(54) METHOD AND APPARATUS FOR MONITORING THE OPERATION OF AN INDUSTRIAL PROCESS

(75) Inventor: Esa Salonen, Pirkkala (FI)

(73) Assignee: Metso Automation Oy, Helsinki (FI)

( * ) Notice: Subject to any disclaimer, the term of this patent is extended or adjusted under 35 U.S.C. 154(b) by 0 days.

(21) Appl. No.: 09/836,021

(22) Filed: Apr. 17, 2001

(65) Prior Publication Data
US 2002/0138168 A1 Sep. 26, 2002

Related U.S. Application Data

(63) Continuation of application No. PCT/FI99/00863, filed on Oct. 19, 1999.

(51) Int. Cl.$^7$ .................................................. G06F 11/00
(52) U.S. Cl. .......................................... 702/188; 700/80
(58) Field of Search .............................. 702/31, 32, 113, 702/114, 115, 122, 179, 181, 182, 185, 184, 188; 700/61, 83, 17, 80, 9, 282; 345/839, 965

(56) References Cited

U.S. PATENT DOCUMENTS

| | | | | |
|---|---|---|---|---|
| 3,905,025 A | * | 9/1975 | Davis et al. ................ 710/244 |
| 4,389,706 A | * | 6/1983 | Gomola et al. ................ 700/1 |
| 4,805,089 A | * | 2/1989 | Lane et al. .................... 700/83 |
| 4,967,337 A | | 10/1990 | English et al. |
| 5,274,572 A | | 12/1993 | O'Neill et al. |
| 5,315,502 A | | 5/1994 | Koyama et al. |
| 5,488,697 A | | 1/1996 | Kaemmerer et al. |
| 5,617,311 A | * | 4/1997 | Easter et al. .................. 700/80 |
| 5,817,958 A | * | 10/1998 | Uchida et al. ............. 73/865.9 |
| 5,822,745 A | | 10/1998 | Hekmatpour |
| 5,825,361 A | * | 10/1998 | Rubin et al. ................ 345/839 |
| 5,975,737 A | * | 11/1999 | Crater et al. .................... 700/9 |
| 6,176,421 B1 | * | 1/2001 | Royal, Jr. et al. ........... 235/381 |
| 6,236,332 B1 | * | 5/2001 | Conkright et al. ........... 340/3.1 |
| 6,370,448 B1 | * | 4/2002 | Eryurek ...................... 700/282 |

* cited by examiner

Primary Examiner—Marc S. Hoff
Assistant Examiner—Mohamed Chariovi
(74) Attorney, Agent, or Firm—Alston & Bird LLP

(57) ABSTRACT

The invention relates to method and equipment for monitoring the operation of an industrial process. The industrial process is used as a basis for compiling a document comprising a group of cause-effect relationships dependent on the industrial process. From the industrial process is collected status data of the process. A document server compares the process status data with the data provided by the group of cause-effect relationships and produces a plain-language account of the status of the industrial process.

16 Claims, 1 Drawing Sheet

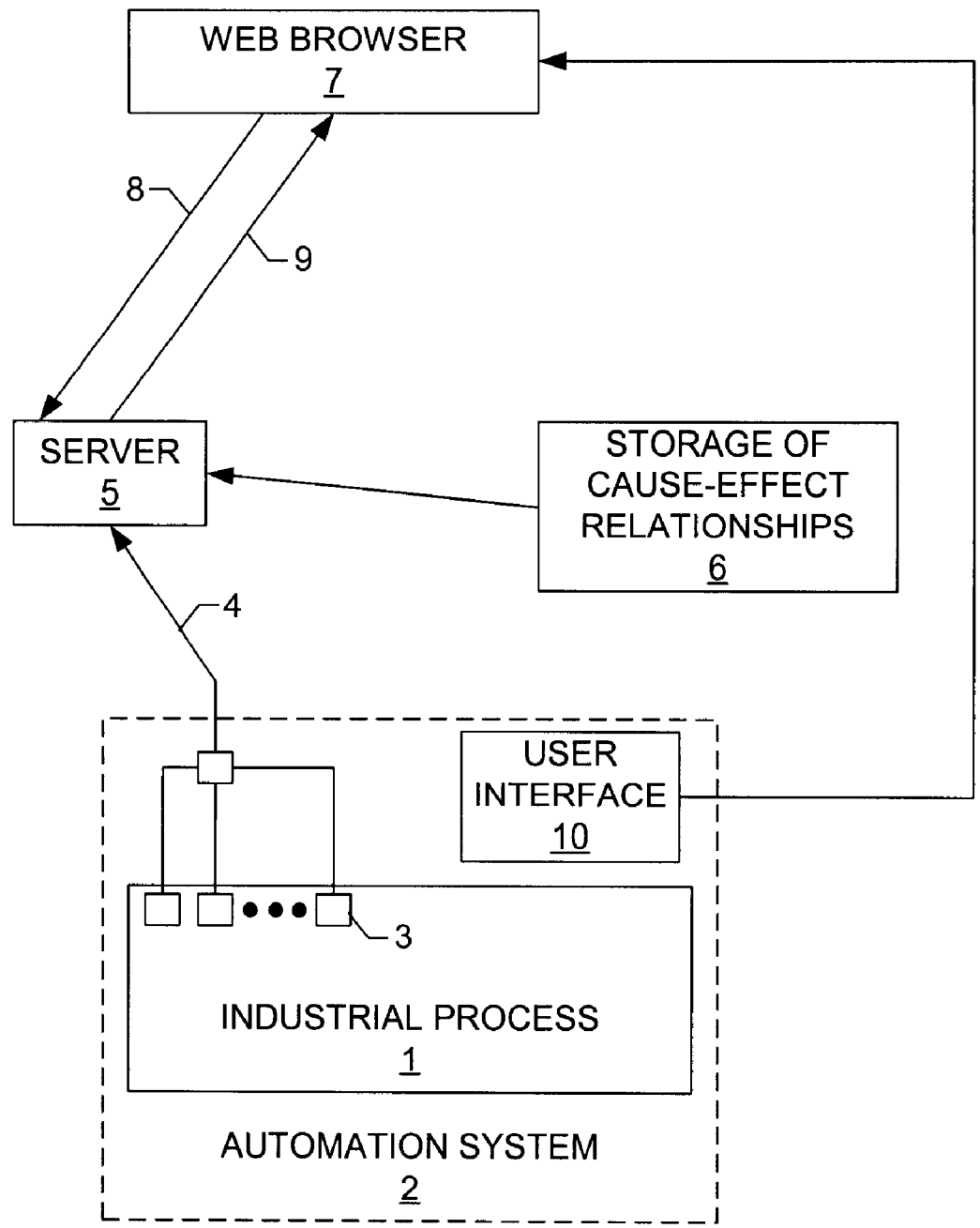
FIG.

METHOD AND APPARATUS FOR MONITORING THE OPERATION OF AN INDUSTRIAL PROCESS

CROSS-REFERENCE TO RELATED APPLICATIONS

This application is a continuation application of PCT U.S. Patent Application No. PCT/FI99/00863 filed on Oct. 19, 1999, which claims priority from Finnish Application No. 982262 filed on Oct. 19, 1998, the contents of which are incorporated in their entirety herein.

FIELD OF THE INVENTION

The present invention relates to an apparatus and method for monitoring the operation of an industrial process. In particular, the invention relates to an apparatus and method for collecting and displaying status data concerning the industrial process.

BACKGROUND OF THE INVENTION

The reliability and accuracy of an industrial process is usually controlled by an automation system. Industrial processes, such as paper manufacturing processes and power plant processes, are extremely extensive and complex, and they involve a plurality of variables, the monitoring of the process operations thus being considerably difficult. An automation system contains various programmed process-specific preconditions to operate and regulate the equipment in the process. The operation of an industrial process is usually monitored using a computer display that shows the status of the process in the form of different icons and numbers. However, if the process is even slightly complicated, it is difficult to monitor and evaluate the behaviour of the process on the basis of the status data. For understanding the status data, a separate textual instructions document is therefore needed which uses the names and identifiers of the devices involved to describe the cause-effect relationships relating to them. On the basis of the information on the process status displayed, the user retrieves the correct instructions document and, using process identifiers, s/he retrieves from the document the data illustrating the process status. On the basis of the current status of the process, s/he then interprets the instructions document. Prior art also knows a solution where the instructions document is stored in the database and the display showing the process status is provided with a link to the instructions document, thus enabling the group of cause-effect relationships relating to the equipment in question to be displayed. This solution is disclosed for example in U.S. Pat. No. 5,822,745. A separate instructions document is, however, difficult and laborious to use, and the data has to be fetched separately. Furthermore, the information provided in the instructions document must be interpreted, which may lead to misinterpretations.

U.S. Pat. No. 4,967,337 describes an automated diagnostics system for monitoring an industrial apparatus, such as a plasma etcher. In the system, the apparatus to be diagnosed is modelled into an expert system. The system is interactive in that it poses questions to the technician repairing the system, thus guiding him/her to run different tests for locating a fault. The purpose of the interactivity is to find an instruction for repairing the fault. The system is relatively difficult to use and it also requires a user skilled in an interactive functionality. Furthermore, the system is not suitable for monitoring the operation of an industrial process because due to the extent of the process and the resultant large number of variables, the modelling of the process into the expert system is in practice impossible.

U.S. Pat. No. 5,488,697 describes the use of an expert system for monitoring problem situations in a manufacturing process. The expert system of the described solution allows process statuses to be stored, the statuses being then classified by the users. In other words, the users store into the system the meaning of the different statuses, i.e., the type of fault that may be involved in a particular situation. The system thereafter continuously monitors the process and compares the statuses stored in the expert system with the current status and informs the users if a problem status emerges. This solution cannot be used for monitoring the operation of industrial processes either, because in practice it is not possible to model all process statuses of the operation of an industrial process into the expert system.

U.S. Pat. No. 5,315,502 discloses a method for supporting the operation of an industrial plant, the method employing different knowledge-based databases. The knowledge databases contain stored normal values of process variables and the ranges of variation of the values as well as counter measures for different situations. The solution cannot be applied to monitor the operation of industrial processes because they are so complicated that all normal values of the process variables, the ranges of variation of the values, and the required measures cannot be modelled in the way required by the solution disclosed in U.S. Pat. No. 5,315,502.

U.S. Pat No. 5,274,572 discloses a knowledge-based method for signal monitoring and analysis. The solution aims at producing a plain-language account of a disturbance, but also this system requires that the entire solution to be monitored is modelled. Therefore the solution of U.S. Pat. No. 5,274,572 is not suitable either for monitoring the operation of a complicated industrial process involving a plurality of variables.

SUMMARY OF THE INVENTION

An object of the present invention is to provide a method and an equipment with which the monitoring of an industrial operation is simple and easy.

The method of the invention is characterized in that the data in the group of cause-effect relationships is subjected to preconditions based on the process status data, the process status data comprising a plurality of data, each of which contains a precondition for a particular data in the group of cause-effect relationships, a document server searching the group of cause-effect relationships in phases for outputs defined as true, and the document server being used to produce a plain-language account of the process status on the basis of the outputs.

The equipment of the invention, in turn, is characterized in that the data in the group of cause-effect relationships is subjected to preconditions based on the status data; that the process status data comprises a plurality of data, each of which contains a precondition for a particular data in the group of cause-effect relationships; and that the equipment further comprises a document server for combining the process status data and the data in the group of cause-effect relationships, the document server being arranged to search the group of cause-effect relationships in phases for outputs defined as true and to produce a plain-language account of the process status.

An essential idea of the invention is that the document server collects process status data, compares the data with the group of cause-effect relationships, and produces a plain-language account of the situation. A preferred embodiment is based on the idea that the plain-language account is a dynamic document. A second preferred embodiment is based on the idea that the dynamic document is based on hypertext technology. A third preferred embodiment is based on the idea that the document server is a World Wide Web or general web server and that the user interface displaying the document is a web browser.

An advantage of the invention is that with the solution of the invention the monitoring of an industrial process is accurate, convenient and straightforward. Further, the current status of the process and the consequences of the status can be made rapidly and explicitly available for use to the operating staff. In addition, the user need not know all parts and devices of the process in detail, because he/she does not need to instruct the system to locate a fault or to store additional data into the system. The invention enables the user to retrieve a complete, up-to-date document when necessary, without the user having to create it.

BRIEF DESCRIPTION OF THE DRAWINGS

Having thus described the invention in general terms, reference will now be made to the accompanying drawing, which is not necessarily drawn to scale and is a block diagram illustrating equipment of the invention according to one embodiment.

DETAILED DESCRIPTION OF THE INVENTION

The present invention now will be described more fully hereinafter with reference to the accompanying drawing, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art.

The FIGURE shows an industrial process 1, such as a paper manufacturing process, power plant process or some other industrial process typically comprising a plurality of variables. The industrial process 1 is controlled and regulated using an automation system 2, shown with a broken line, in a manner known in the art. The automation system usually also comprises a user interface 10. Sensors 3 collect data about the status of the industrial process 1 for the automation system. The data on the process status is naturally also influenced by the values of control variables. The process status data 4 is transmitted from the automation system 2 to the document server 5. The document server 5 can be a computer that collects the process status data 4 and forwards them. The document server 5 is preferably a World Wide Web or other type of web server.

The preconditions defined by the automation system 2 are used for compiling an instructions document, i.e., a group of cause-effect relationships 6, which gives in text form the cause-effect relationships relating to the devices and parts of devices used in the industrial process 1 and to the operation of the process. The document server 5 combines the process status data 4 and the data it has retrieved from the group of cause-effect relationships 6. The document created by the document server 5 is read for example by using a web browser 7 or another suitable document viewing program. A request 8 to display the operation of a particular object is transmitted using the web browser 7, the document server 5 then producing a plain-language account of the situation, preferably a dynamic document 9, to be viewed with the web browser 7. A user interface 10 of the automation system can also be used, together with the web browser 7, to obtain the process status data. In this case, a request is sent from the user interface 10 of the automation system via the web browser 7 to the document server 5. The document server 5 transmits the completed document to the browser 7 for viewing. For the user, the system is simple to use: he/she can point directly to the desired object displayed for example by the user interface 10 of the automation system or the web browser 7, or name the object in writing, and thus obtain the correct, updated document without having to browse the instructions document or to indicate the object with a number code, for example. This is possible because of the link mechanism between the web browser 7 and the document server 5.

The process status data 4 may comprise for example data indicating that a pump AA has come to a halt, or that the surface of the contents in equalizing reservoir BB has dropped below the minimum level. On the basis of these process status data 4, the document server 5 searches the group of cause-effect relationships 6 for a solution where the data concerned are true and uses the solution to produce a plain-language account of the situation, such as "the locking system has halted pump AA because the surface of the contents in equalizing reservoir BB has dropped below the minimum level". In other words, the basic idea is that the text of the group of cause-effect relationships 6 is subjected to preconditions based on the process status data 4, i.e., if the status variable is true, the corresponding part of the document is printed and, correspondingly, if the status variable is untrue, the text in question is not printed. The process status data 4 thus contains a plurality of data, the corresponding outputs being retrieved in phases from the group of cause-effect relationships 6 by the document server 5. The data "the locking system has halted pump AA" can be based on various reasons. Since the process status data 4 comprises one reason which is true, the document server 5 prints an account "the locking system has halted pump AA" in the first phase and an account "the surface of the contents in equalizing reservoir BB has dropped below the minimum level" in the second phase. The user, however, naturally only sees the plain-language account given above. The group of cause-effect relationships 6 does not need to contain all possible combinations, but a combination is formulated as the need arises. The document server 5 uses those items of the group of cause-effect relationships 6 where the status variable is true. The entire industrial process 1 does not therefore need to be modelled, only specific parts of it. The document server 5 searches the group of cause-effect relationships 6 precondition by precondition for a plain-language account, i.e., plain-language accounts are formulated as needed whenever a new combination appears.

The account of the situation is preferably a dynamic document 9. The user can thus update the document by pointing to an object in the user interface by clicking it with the mouse button for example. The account can also change its form when the process status data 4 changes. For example, the data in the dynamic document 9 can have the form "valve CC, status: closed," in which case the data written in italics changes if the process status data 4 changes. The dynamic document 9 can be advantageously produced using hypertext technology. The dynamic document 9 can also be updated at regular intervals, for example. An updating at an interval of one minute, for example, might be appropriate to allow the process controller operating the equipment to perceive the situation displayed on the screen.

The dynamic document 9 is, in other words, a plain-language text document stating the actual status of the process. The dynamic document 9 can also include process data, which are not true at a particular time. In addition, the document may contain informative data on statically determined preconditions. Furthermore, the data can be illustrated by using colours, for example so that green indicates that a normal status is concerned and red that the status being examined is an exceptional one. This allows the user reading the dynamic document 9 to rapidly find out the reason that caused the situation and possibly to obtain information about the necessary measures.

As mentioned above, the user interface for displaying the plain language document is typically a web browser. However, it must be understood that some other suitable on-line program can be used as the document viewing program.

Many modifications and other embodiments of the invention will come to mind to one skilled in the art to which this invention pertains having the benefit of the teachings presented in the foregoing descriptions and the associated drawing. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for monitoring the operation of an industrial process, the method comprising the steps of:
    collecting process status data relating to the process;
    creating a document comprising a group of cause-effect relationships related to the industrial process, wherein data in the group of cause-effect relationships is subjected to preconditions based on the process status data, and wherein the process status data comprises a plurality of data, each of which contains a precondition for a particular data in the group of cause-effect relationships;
    searching the group of cause-effect relationships in phases for outputs defined as true; and
    producing a plain-language account of the process status on the basis of the outputs, where the plain-language account includes a statement of an effect along with a statement describing the cause of the effect.

2. A method according to claim 1, wherein said producing step produces a dynamic document containing a plain language account of the process status.

3. A method according to claim 2, wherein said producing step produces a dynamic document that changes as the process status changes.

4. A method according to claim 2, wherein said producing step updates the dynamic document when a user points to an object.

5. A method according to claim 2, wherein said producing step updates the dynamic document at regular intervals.

6. A method according to claim 2, wherein said producing step produces the dynamic document using hypertext technology.

7. A method according to claim 1, wherein said producing step produces a plain-language account of the process status that is viewable using a web browser.

8. A method according to claim 1, wherein said searching and producing steps are performed by a web server.

9. An equipment for monitoring the operation of an industrial process comprising:
    means for collecting status data related to the industrial process;
    storage unit for storing a group of cause-effect relationships data related to the industrial process, wherein data in the group of cause-effect relationships is subjected to preconditions based on the status data, and wherein the process status data comprises a plurality of data, each of which contains a precondition for a particular data in the group of cause-effect relationships; and
    a document server for combining the process status data and the data in the group of cause-effect relationships, wherein said document server searches the group of cause-effect relationships in phases for outputs defined as true to produce a plain-language account of the process status, where the plain-language account includes a statement of an effect along with a statement describing the cause of the effect.

10. An equipment according to claim 9, wherein said document server is capable of producing a dynamic document.

11. An equipment according to claim 9, wherein said document server is capable of producing a dynamic document, wherein the dynamic document is arranged to change as the process status data changes.

12. An equipment according to claim 9, wherein said document server is capable of producing a dynamic document, wherein the dynamic document is arranged to be updated as a user points to an object.

13. An equipment according to claim 9, wherein said document server is capable of producing a dynamic document, wherein the dynamic document is arranged to be updated at regular intervals.

14. An equipment according to claim 9, wherein said document server is capable of producing a dynamic document, wherein the dynamic document is produced using hypertext technology.

15. An equipment according to claim 9 further comprising a web browser for viewing the account process status.

16. An equipment according to claim 9, wherein said document server is a web server.

* * * * *

UNITED STATES PATENT AND TRADEMARK OFFICE
CERTIFICATE OF CORRECTION

PATENT NO. : 6,701,285 B2
DATED : March 2, 2004
INVENTOR(S) : Salonen

It is certified that error appears in the above-identified patent and that said Letters Patent is hereby corrected as shown below:

<u>Title page,</u>
Insert the following:
-- [30]  Foreign Application Priority Data
October 19, 1998 (FI)          982262 --.

Signed and Sealed this

Eighteenth Day of May, 2004

JON W. DUDAS
*Acting Director of the United States Patent and Trademark Office*